(12) United States Patent
Bertilsson et al.

(10) Patent No.: US 6,945,235 B1
(45) Date of Patent: Sep. 20, 2005

(54) PULSE REFLECTING METHOD AND ARRANGEMENT IN AN EXHAUST GAS RECIRCULATION SYSTEM

(75) Inventors: Bert-Inge Bertilsson, Floda (SE); Ivar Sahlén, Öckerö (SE); Annika Carlsson, Kungälv (SE)

(73) Assignee: Volvo Lastvagner AB, Göteborg (SE)

( * ) Notice: Subject to any disclaimer, the term of this patent is extended or adjusted under 35 U.S.C. 154(b) by 0 days.

(21) Appl. No.: 10/604,946

(22) Filed: Aug. 28, 2003

(51) Int. Cl.[7] ............................................. F02M 25/07
(52) U.S. Cl. ............................. 123/568.11; 123/568.12; 60/605.2
(58) Field of Search ...................... 123/568.11, 568.12, 123/568.21; 60/278, 279, 605.2, 324

(56) References Cited

U.S. PATENT DOCUMENTS

| | | | |
|---|---|---|---|
| 5,661,973 A | * | 9/1997 | Casey .......................... 60/279 |
| 6,321,536 B1 | * | 11/2001 | Henderson et al. ......... 60/605.2 |
| 6,408,834 B1 | * | 6/2002 | Brackney et al. .......... 60/605.2 |
| 6,782,696 B2 | * | 8/2004 | Shigahara et al. ............ 60/278 |

FOREIGN PATENT DOCUMENTS

| | | | |
|---|---|---|---|
| GB | 2353328 A | * | 2/2001 |
| JP | 60-224961 A | * | 11/1985 |
| JP | 11-82181 A | * | 3/1999 |

* cited by examiner

Primary Examiner—Willis R. Wolfe, Jr.
(74) Attorney, Agent, or Firm—Noak, Druce & Quigg, LLP (57) ABSTRACT

Method and arrangement for enhancing exhaust gas recirculation efficiency on a combustion engine by providing a combustion engine having an exhaust system in fluid communication, via at least one juncture, with an exhaust gas recirculation system and locating a reflector in the exhaust system downstream of the at least one juncture. The reflector is adapted to reflect at least a portion of exhaust gas pressure pulses emitting from the combustion engine thereby causing a reflected pressure pulse to occur upstream of the reflector, and deflecting at least a portion of the reflected pressure pulse into the exhaust gas recirculation system thereby enhancing the efficiency of the exhaust gas recirculation system.

23 Claims, 6 Drawing Sheets

PULSE REFLECTING METHOD AND ARRANGEMENT IN AN EXHAUST GAS RECIRCULATION SYSTEM

BACKGROUND OF INVENTION

1. Field of the Invention

The present invention relates generally to a method and apparatus for enhancing exhaust gas recirculation efficiency on a combustion engine, and more particularly to a pulse reflector that enhances the exhaust gas recirculation efficiency and reduces engine emissions.

2. Background

The demand for cleaner burning internal combustion engines has continued to increase in recent years culminating from both a general desire to reduce emissions and from increasingly strict environmental legislation. The concern regarding combustion engines stems from the fact that they, as a result of operation, typically produce products in the emitted exhaust that can be harmful to the environment. Common examples of these types of products include nitrous oxides, carbon monoxide, carbon dioxide, and various hydrocarbons. These products not only pose harm to the environment, but some represent wastefulness in that they have not been fully burned and have a capacity for releasing additional stored potential energy. Several methods have been developed to reduce these emissions, such as modifying the design of the combustion chamber and adjusting the timing of injecting fuel into the engine.

Current environmental standards and future expected legislation have made the issue of emissions a special concern for the diesel utilizing industries. Fuel economy has always been an important goal of these industries, and in particular, the diesel-powered transport businesses. At least partially in answer to these criteria, one method for reducing emissions from a diesel engine has been developed, and is achieved by providing the engine with an exhaust gas recirculation system, commonly known as an EGR system. The present invention is directed to such an EGR system.

An EGR system recirculates a portion of exhaust gas back into the air intake side of a combustion engine. This recirculation not only allows for further combustion of the exhaust products, but it also selectively advantageously dilutes the incoming air/fuel in the cylinders. It is known that formation of certain pollutants, such as $NO_x$, in a diesel engine is exponentially proportional to the temperature in the combustion chamber. By lowering the combustion temperature, these $NO_x$ emissions are successfully reduced.

An EGR system recirculates at least a portion of the exhaust gas by joining the exhaust system with the air intake system by means of a special return path. As expected, the emitted exhaust gas is rather high in temperature. The EGR system seeks to dilute the incoming air/fuel charge and preferably lower the combustion temperature. Thus, an EGR cooler preferably cools the exhaust gas before it is returned to the air intake system.

A controllable valve regulates the amount of exhaust gas entering into the EGR bypass. A control unit will monitor and vary the degree of opening of the controllable valve depending on several parameters such as current operating conditions of the engine and the temperature of the coolant in the EGR cooler. Opening the controllable valve permits exhaust gases to recirculate back to the engine air-intake, but if there is insufficient pressure within the exhaust system itself, flow of exhaust gases through this valve will not be achieved. In other words, the pressure of the exhaust gases in the exhaust system must, at least occasionally, exceed the pressure at the intake side of the engine, a pressure imbalance is created that drives the exhaust gases through the EGR system. This pressure differential drives conventional EGR systems, and produces a corresponding decrease in emissions. Without this drive pressure, the EGR system will not operate at all, or at least not efficiently.

The industry has therefore sought to address the problem of insuring a sufficient amount of drive pressure within the exhaust side of the engine. For example, turbo units incorporating variable turbine geometry can be used toward, at least intermittently, this purpose. By varying the angle of the turbine blades, a sufficiently high pressure can be built up on the exhaust side of the engine. This solution has, however, the disadvantage that it results in deterioration of the engine's gas-exchange and heat balance, which in turn makes the engine less efficient. Another method selectively isolates each cylinder and inserts a shunt valve, which also works as a metering valve, to control the amount of exhaust gases required at that particular point in the system. However, by only using exhaust gases from one cylinder at a time, the recirculated exhaust gas is not distributed evenly into the intake system. The exhaust gases are emitted as high-pressure pulses, not a continuous flow, and thus the pulses distribute unevenly to the cylinders at the intake side of the engine. If there is too great a range in the amount of exhaust gases fed into the cylinders, there will be an insufficient reduction in the emissions. Thus there is a need in the industry to provide a high amount of drive pressure, or over-pressure in the exhaust system to enhance the efficiency of an EGR system leading to a decrease in emissions.

The present invention provides a simple, elegant solution to effectively raise the drive pressure in the EGR system thereby enhancing the efficiency of the engine and reducing emissions.

SUMMARY OF INVENTION

A primary embodiment of the present invention provides for a method and arrangement to enhance the amount of exhaust gas recirculation efficiency on a combustion engine by providing a combustion engine having an exhaust system in fluid communication, via at least one juncture, with an exhaust gas recirculation system and locating a reflector in the exhaust system downstream of that juncture. The reflector is adapted to reflect at least a portion of exhaust gas pressure pulses emitting from the combustion engine thereby causing a reflected pressure pulse to occur upstream of the reflector, and deflecting at least a portion of the reflected pressure pulse into the exhaust gas recirculation system thereby enhancing the efficiency of the exhaust gas recirculation system.

Another embodiment of the present invention provides for locating a one-way valve in the exhaust gas recirculation system that is configured to permit an upper-pressure portion of the pressure pulses directed into the exhaust gas recirculation system to be conveyed to an inlet air manifold of the combustion engine.

An associated embodiment of that described above is that the one-way valve is biased toward a closed configuration by a spring force. The spring force is selected to be overcome, and the one-way valve moved to an open configuration, when an upstream gas pressure relative to the one-way valve exceeds a predetermined threshold pressure thereby capturing the upper-pressure portion of the pressure pulses for conveyance to the inlet air manifold.

A primary embodiment of the present invention also provides for locating a turbine in the exhaust system, and locating the reflector upstream of the turbine in the exhaust system.

Another embodiment of the present invention provides for configuring the exhaust system to define an exhaust gas flow path and configuring the reflector as a projection into the exhaust gas flow path.

An associated embodiment of that described above is that the reflector is configured in a sheet form thereby establishing an abrupt restriction in the exhaust gas flow at an upstream side of the reflector and an abrupt expansion in the exhaust gas flow at a downstream side of the reflector.

Similar to the above, another embodiment of the present invention provides for arranging a reflective face of the reflector at a substantially right angle to the exhaust gas flow path.

The above-described embodiments can also providing for configuring the reflective face symmetrically with respect to the exhaust gas flow.

If a turbine is incorporated in the exhaust system for recovering energy from the exhaust gas pressure pulses emitted from the combustion engine, the turbine can be advantageously selected so that a collective efficiency of energy recovery and exhaust gas recirculation effectiveness is optimized. That is to say, the character of the selected turbine may be varied so that total efficiency is optimized; whether that efficiency is measured in terms of engine power or emission reduction, among others. For instance, a smaller, tighter turbine may be used that potentiates exhaust gas recirculation improving emissions, but compromises engine power/efficiency because less power is recovered from the exhaust stream. Further, fixed-geometry turbines, which are less expensive and less complex than variable geometry turbines may be advantageously utilized in the present invention and the embodiments disclosed; total system design is considered to achieve an aggregate optimized system efficiency that produces prescribed effects regardless of whether based on power or emissions optimization.

Another embodiment of the present invention provides for configuring the reflector as a gasket secured between a first and second flange.

Another primary embodiment of the present invention provides for an enhanced exhaust gas recirculation system for a combustion engine comprising (including, but not limited to) a combustion engine having an exhaust system in fluid communication, via at least one juncture, with an exhaust gas recirculation system, and a reflector means located in the exhaust system downstream of the at least one juncture, the reflector means configured for reflecting at least a portion of exhaust gas pressure pulses emitted from the combustion engine thereby causing a reflected pressure pulse to occur upstream of the reflector and the exhaust and exhaust gas recirculation systems being together configured to deflect at least a portion of the reflected pressure pulse into the exhaust gas recirculation system thereby enhancing the efficiency of the exhaust gas recirculation system.

A related embodiment further provides for a one-way valve located in the exhaust gas recirculation system, the one-way valve being configured to permit an upper-pressure portion of pressure pulses directed into the exhaust gas recirculation system to be conveyed to an inlet air manifold of the combustion engine.

An associated embodiment of that described above is that the one-way valve is biased toward a closed configuration by a spring force, the spring force being selected to be overcome and the one-way valve moved to an open configuration when an upstream gas pressure thereto exceeds a predetermined threshold pressure thereby capturing the upper-pressure portion of the pressure pulses for conveyance to the inlet air manifold.

Unique methods and arrangements are defined above relative to the present invention(s) that serve as basis for useful and in-demand products of the several concerned industries, and especially the transportation industries that are heavily dependent on diesel powered vehicles.

BRIEF DESCRIPTION OF DRAWINGS

The foregoing and other features and aspects of the present disclosure will be best understood with reference to the following detailed description of embodiments of the invention, when read in conjunction with the accompanying drawings, wherein.

DETAILED DESCRIPTION

In the disclosure that follows, in the interest of clarity, not all features of actual implementations are described in this disclosure. It will of course be appreciated that in the development of any such actual implementation, as in any such project, numerous engineering and design decisions must be made to achieve the developers' specific goals; e.g., compliance with mechanical and business related constraints, which will vary from one implementation to another. While attention must necessarily be paid to proper engineering and design practices for the environment in question, it should be appreciated that the development of a method to enhance exhaust gas recirculation efficiency on a combustion engine would nevertheless be a routine undertaking for those of skill in the art given the details provided by this disclosure, even if such development efforts are complex and time-consuming.

Figure 1:
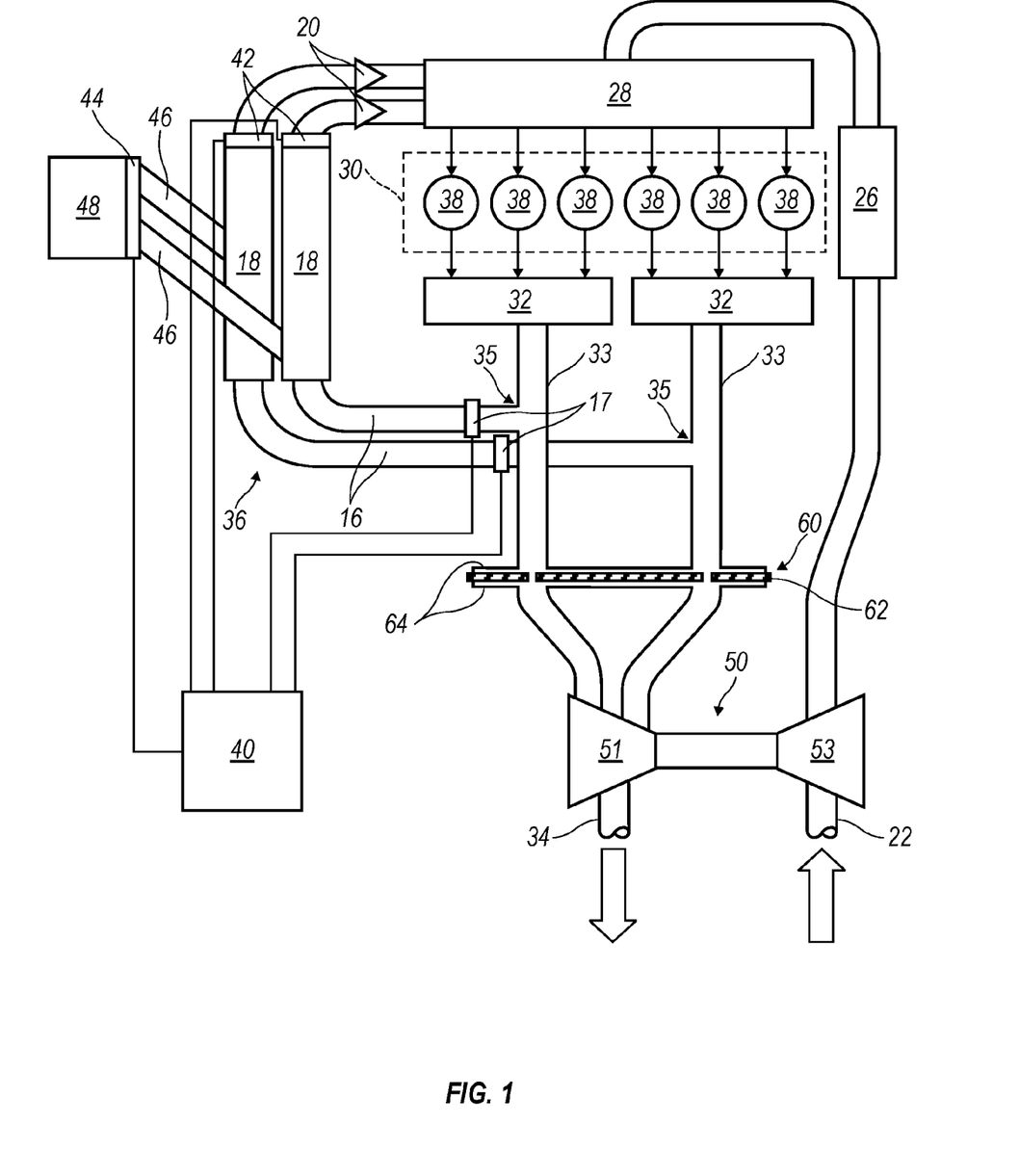
FIG. 1 is a schematic representation of an internal combustion engine with an exhaust gas recirculation system incorporating a reflector means according to the teachings of the present invention.

The present invention provides a simple, elegant method for enhancing the efficiency of an exhaust gas recirculation system. Turning to FIG. 1, a pulse reflector 60 has been incorporated into the exhaust system of an internal combustion engine 30 with an EGR system 36. To aid in the understanding of the present invention, the airflow path through the engine 30 and through the EGR will be described briefly.

Initially, outside air is introduced into the engine 30 through an inlet 22. A compressor 53 may then direct this air into an inlet air manifold 28. The air may preferably be cooled before entering the inlet air manifold 28 by a charge air cooler 26 to improve the efficiency of the combustion process. From the inlet air manifold 28, the air then enters into cylinders 38 of the engine 30 where it is combined with injected fuel for combustion. As shown, but of course not necessary for the present invention, the cylinders 38 operate synchronously in groups of three. In other words, the first group of three cylinders 38 cycle in a timed sequence that is counter to the timed sequence of the second group of three cylinders 38 such that high-pressure exhaust pulses are generated alternately between each group of cylinders 38. From the cylinders 38, the alternating high-pressure pulses flow through the corresponding exhaust manifold 32 and then exit through the corresponding exhaust outlet 33. A turbo unit 50, which typically includes a turbine 51 and the compressor 53, may preferably be located just after the exhaust outlets 33 to recapture a portion of the energy of the exhaust gas before it is released into the environment by way of the outlet pipe 34.

The EGR system 36 of FIG. 1 is similar to that disclosed in U.S. Pat. No. 6,401,699 entitled Combustion Engine Arrangement, and which is expressly incorporated herein by reference in its entirety. The EGR system 36 also captures a portion of the energy of the exhaust gas by means of an EGR bypass 16, one each fluidly connected to the respective exhaust outlets 33 at a corresponding juncture 35. A controller 40 permits the flow of exhaust gas to enter into each EGR bypass 16 by selectively opening controllable valves 17, depending on the given operating parameters. The gas entering from the exhaust outlets 33 into the EGR bypass 16 is quite high in temperature so an EGR cooler 18 is preferable utilized to cool the exhaust gas before recirculating it back into the inlet air manifold 28. By cooling the exhaust gas, the combustion temperature is decreased resulting in more efficient fuel utilization and a decrease in emissions from the engine. A coolant supply unit 48 supplies coolant through coolant pipes 46 to the EGR cooler 18. The controller 40 may monitor the temperature of the coolant by means of a coolant temperature sensor 44. This temperature sensor 44 may be located at the coolant supply unit 48 itself, along the coolant pipes 46 or even within the EGR cooler 18.

After the exhaust gas has cooled within the EGR cooler 18, the gas travels through one-way valves 20. These preferable valves 20 may comprise any of several known one-way valve types, such as a reed-type valve. The one-way valve 20 allows the EGR system 36 to capture upper-pressure portions of the alternating high-pressure pulses from the cylinders 38. After traveling through the one-way valves 20, the exhaust gas will then reenter the inlet air manifold 28 were it is processed.

Figure 2:
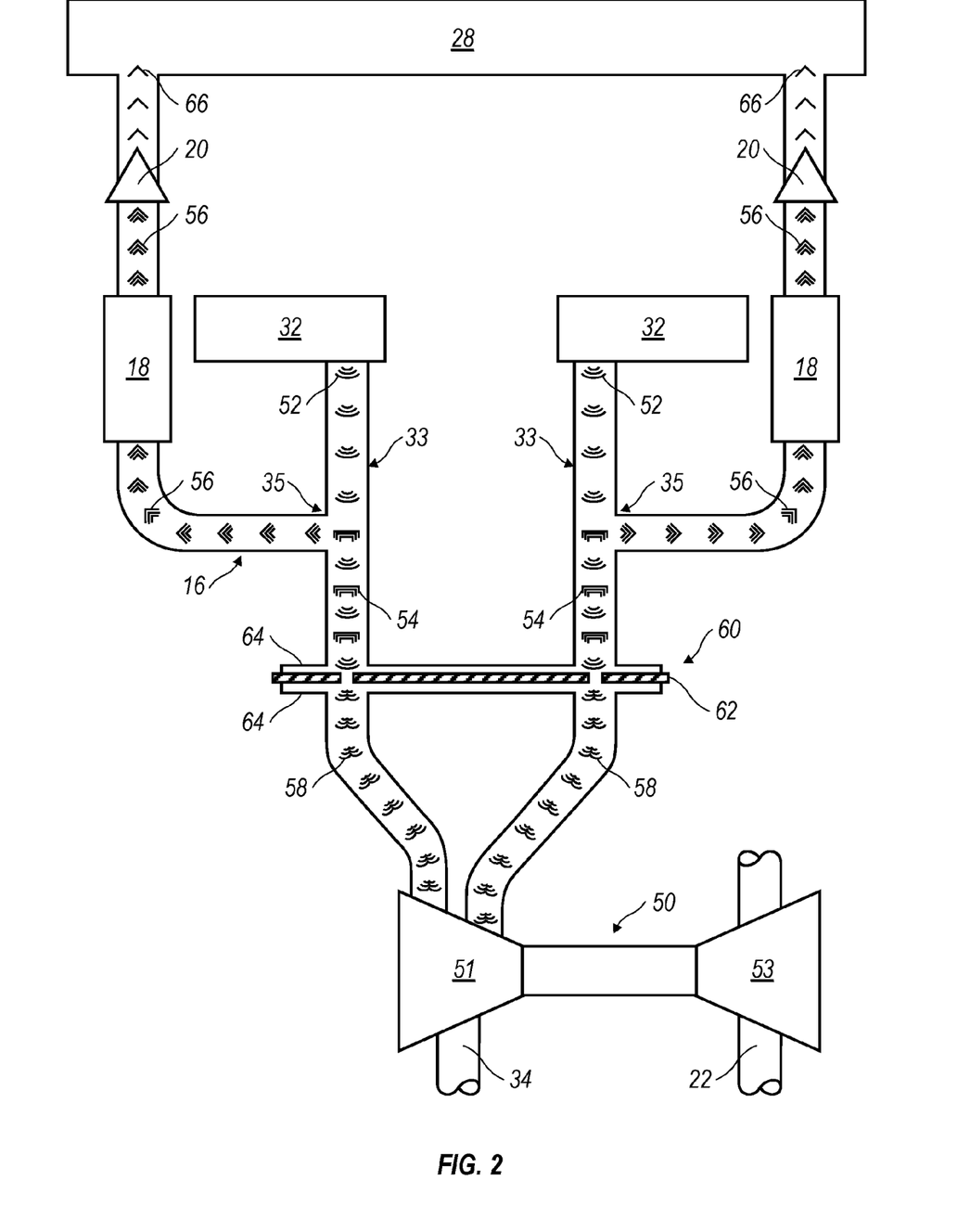
FIG. 2 is a schematic representation of the exhaust gas recirculation system incorporating a reflector means and illustrating the path of travel of the pressure pulses of varying magnitude induced in the exhaust system according to one aspect of the present invention.
Figure 3:
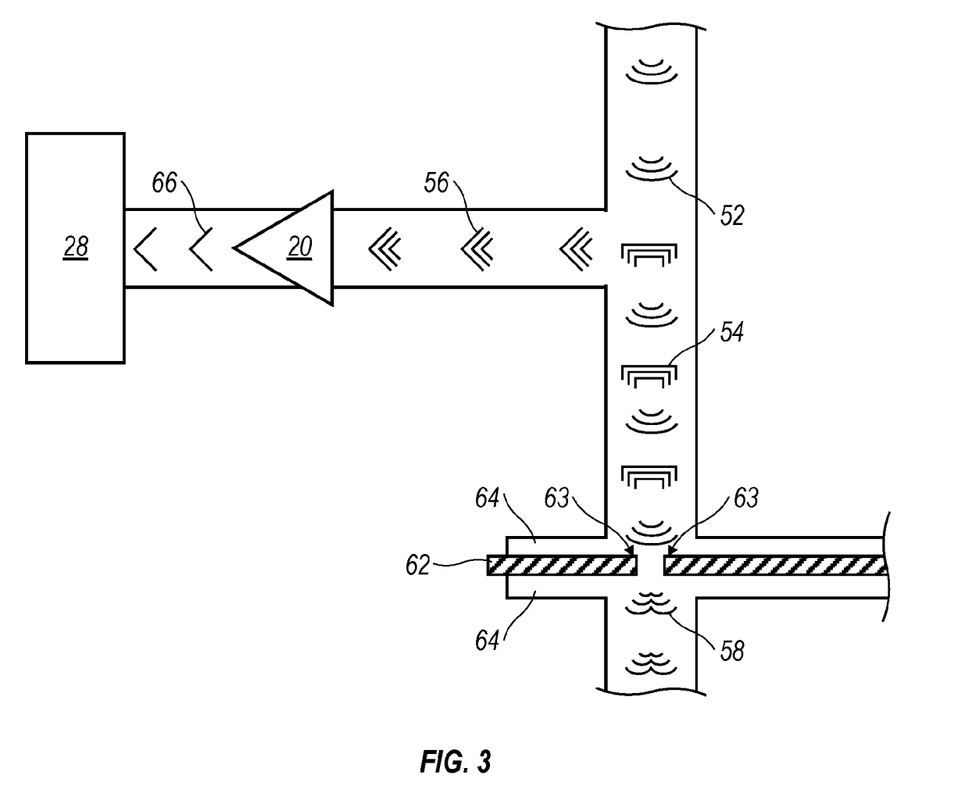
FIG. 3 is an enlarged view of the path of travel of the pressure pulses induced in the exhaust system according to the present invention.

The present invention effectively boosts the proportion of the exhaust gas exiting from the cylinders 38 that meets recirculation criteria thereby resulting in an increase in overall drive pressure through the EGR system by incorporating a pulse reflector (means) 60 within the exhaust system. Referring now to FIG. 2, high-pressure exhaust pulses 52 are emitted from the exhaust manifolds 32. These exhaust pulses 52 then travel through the exhaust outlets 33 where they encounter the reflector means 60. The reflector means 60 may include a device similar to a gasket 62 which may preferably take a sheet form thereby establishing an abrupt restriction in the exhaust gas flow at the upstream side of the reflector means 60 and an abrupt expansion in the exhaust gas flow at a downstream side of the reflector means 60. The gasket 62 preferably has a reflective face 63 that is generally at a right angle to the direction of exhaust gas flow. Thus, when an exhaust pulse 52 encounters or strikes the gasket 62, the gasket 62 will reflect back a certain amount of the exhaust pulse 52. This reflected portion establishes a reflected pulse 54 and the remaining portion of the exhaust pulse 52 that travels past the reflector 62 is described as a restricted high-pressure pulse 58. The pulse 58 is shown to travel to the turbine 51 where a portion of the energy is recaptured and the gas then exits through the outlet pipe 34. At least a portion of the reflected pulses 54 are then deflected into the EGR bypass 16 and form deflected pressure pulses 56 together with directly emitted pulses 52 from the engine 30. An enlarged view of the pulse travel path is shown in FIG. 3.

Figure 7:
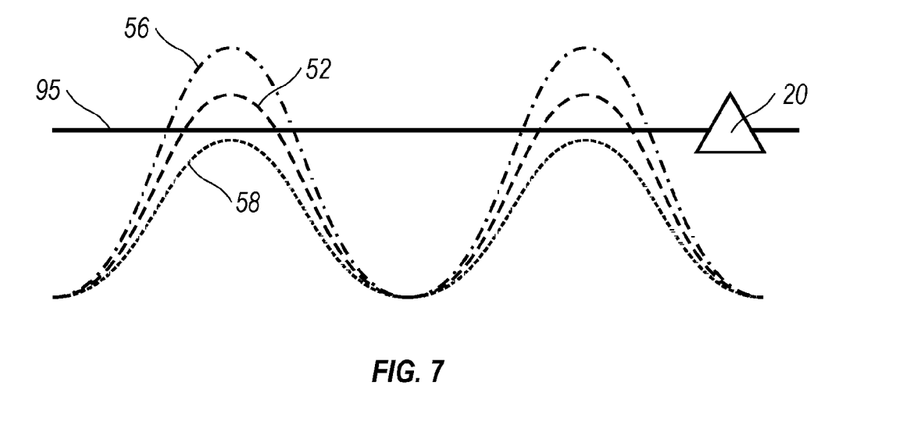
FIG. 7 is a graphical comparison of the drive pressures from one branch of the various high-pressure pulses emitted from the exhaust system according to the present invention.
Figure 8:
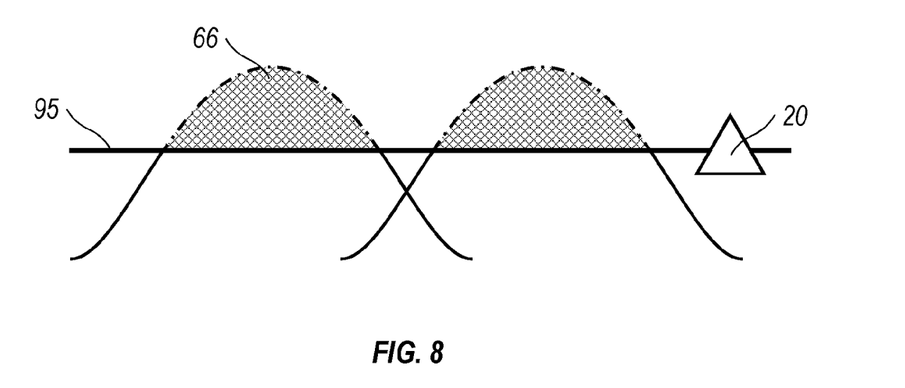
FIG. 8 is a graphical representation of the portion of the deflected high-pressure pulse from two branches captured by the one-way valve according to one aspect of the present invention.

As shown in FIG. 7 and described more fully below, the aggregate deflected pressure pulses 56 have a greater magnitude than the originally emitted exhaust pulses 52, thereby effectively boosting the EGR system and increasing the drive pressure over conventional designs. These deflected pressure pulses 56 may travel through an EGR cooler 18 and on to the one-way valve 20 where an upper-portion 66 of the deflected pulse 56 is captured by the one-way valve 20 and shunted toward the inlet air manifold 28. This upper-pressure portion 66 of the deflected pulse 56 is graphically shown in FIG. 8. In FIG. 8, horizontal line generally represents the threshold pressure of the one-way valve 20, or in other words, the pressure necessary to exceed the bias force and open the one-valve 20. The shaded portion of the high-pressure pulse 56 has exceeded this bias force and thus is effectively captured by the one-way valve 20. It is this captured portion of the pulse that drives the EGR system.

Figure 4:
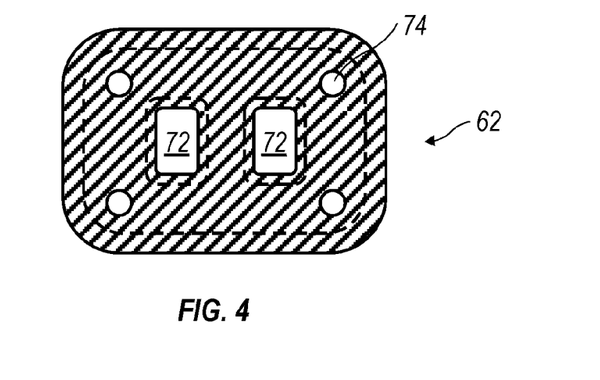
FIG. 4 is a plan view of one embodiment of the reflector means of the present invention of gasket-type configuration.
Figures 5, 6:
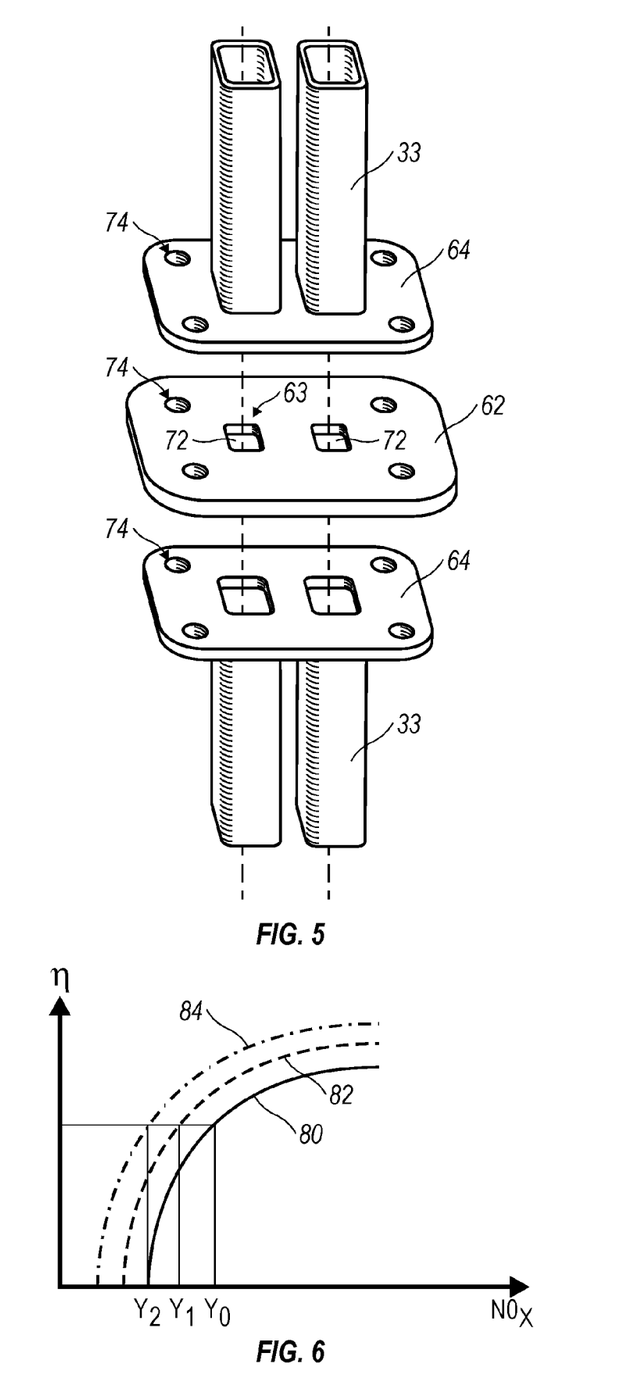
FIG. 5 is an exploded perspective view of the assembly of one embodiment of the present invention incorporating a first and second flange with the gasket-type reflector positioned therebetween.
FIG. 6 is a graphical comparison of various engine configurations with the corresponding engine efficiencies and resulting emissions (in terms of $NO_x$) of each configuration according to one aspect of the present invention.

Turning to FIG. 4, an embodiment resembling a modified gasket 62 is illustrated. As shown, the gasket 62 has two openings 72 formed to coincide with the two exhaust outlets 33. The two openings 72 have a smaller diameter than the exhaust outlets 33 as shown more fully in FIG. 5. The rim of the gasket 62 surrounding the opening 72 thus effectively protrudes within the exhaust gas flow path thereby causing a reflected pressure pulse to occur upstream of the gasket 62. The gasket 62 preferably is in sheet form (constructed from sheet-form material) and thus causes an abrupt restriction within the exhaust gas flow at the upstream side of the gasket 62 and an abrupt expansion in the exhaust gas flow at the downstream side of the gasket 62. Further, as best illustrated in FIG. 5, the edge of the gasket openings 72 preferably form a reflective face 63 that is at a right angle to the flow of exhaust gases through the exhaust outlets 33. This arrangement suitably affects reflection of a portion of emitted exhaust pulses 52 and can be easily adapted (sized and arranged) to affect more or less reflection.

The gasket 62 may further contain connector openings 74 which allow for flanges 64 to join and seal to the gasket 62, thus effectively containing the exhaust gas within the exhaust system. These connector openings 74 may allow for any of several known connecting means, such as threaded bolts, but the present invention is not limited to any particular configuration.

FIG. 6 compares the emissions resulting from several engine configurations. Engine emissions, indicated as $NO_x$, are graphically represented along the x-axis, while engine efficiency, η, is graphically represented along the y-axis. The solid curve 80 represents an internal combustion engine without an EGR system installed. At the indicated engine efficiency, the unadapted engine 80 has a corresponding emissions value labeled $y_o$. The middle curve 82 represents a combustion engine with a conventional EGR system installed and has a reduced emissions value, at the same efficiency as curve 80, labeled $y_1$. Curve 84 represents an engine with a potentiated EGR system installed according to the present invention and has a further reduced emission value of $y_2$ at the same efficiency level as lines 80 and 82. This graph represents the characteristic that at constant engine efficiency, the emissions are reduced with EGR and reduced even further with a potentiated EGR, such as achieved through implementation of the teachings of the present invention. It may be appreciated that as EPA emissions standards become increasingly more strict and the demand for less emissions without losing engine efficiency grows, these heightened requirements will continue to be more easily met with the instant potentiated EGR system.

A graphical representation of the drive forces of the various magnitude-pressure pulses shown at FIGS. 2 and 3 are illustrated in FIG. 7. The horizontal line 95 generally represents the threshold pressure for overcoming the bias of the one-way valve 20. As demonstrated, the restricted pulse 58 may not exceed this threshold. However, the exhaust pulse 52 can exceed this threshold value 95 by a certain degree, and thus the one-way valve would capture a high portion of the untreated pulse to drive the EGR system. This is generally what is found in a conventional pulse EGR system. FIG. 8 However, as the graph demonstrates when the EGR system is potentiated such as with the prescribed reflector means 60, the deflected aggregate pressure pulse 56 more greatly exceeds this threshold pressure. The one-way valve 20 is then able to capture a greater upper portion of the aggregate pressure deflected pulse 56 than when only the untreated exhaust pulse 52 is available.

Figure 9:
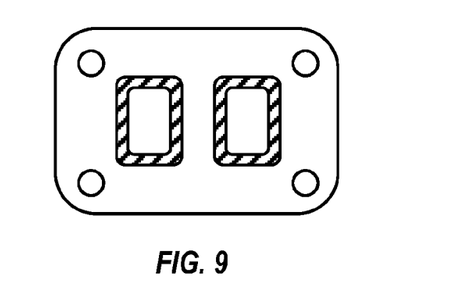
FIG. 9 is a top plan view of another embodiment of the present invention representing an insert pulse reflector.

FIG. 9 illustrates inserts that may be alternatively incorporated into the exhaust gas flow path with the same desired effects derived from the gasket-style reflector.

Figure 10:
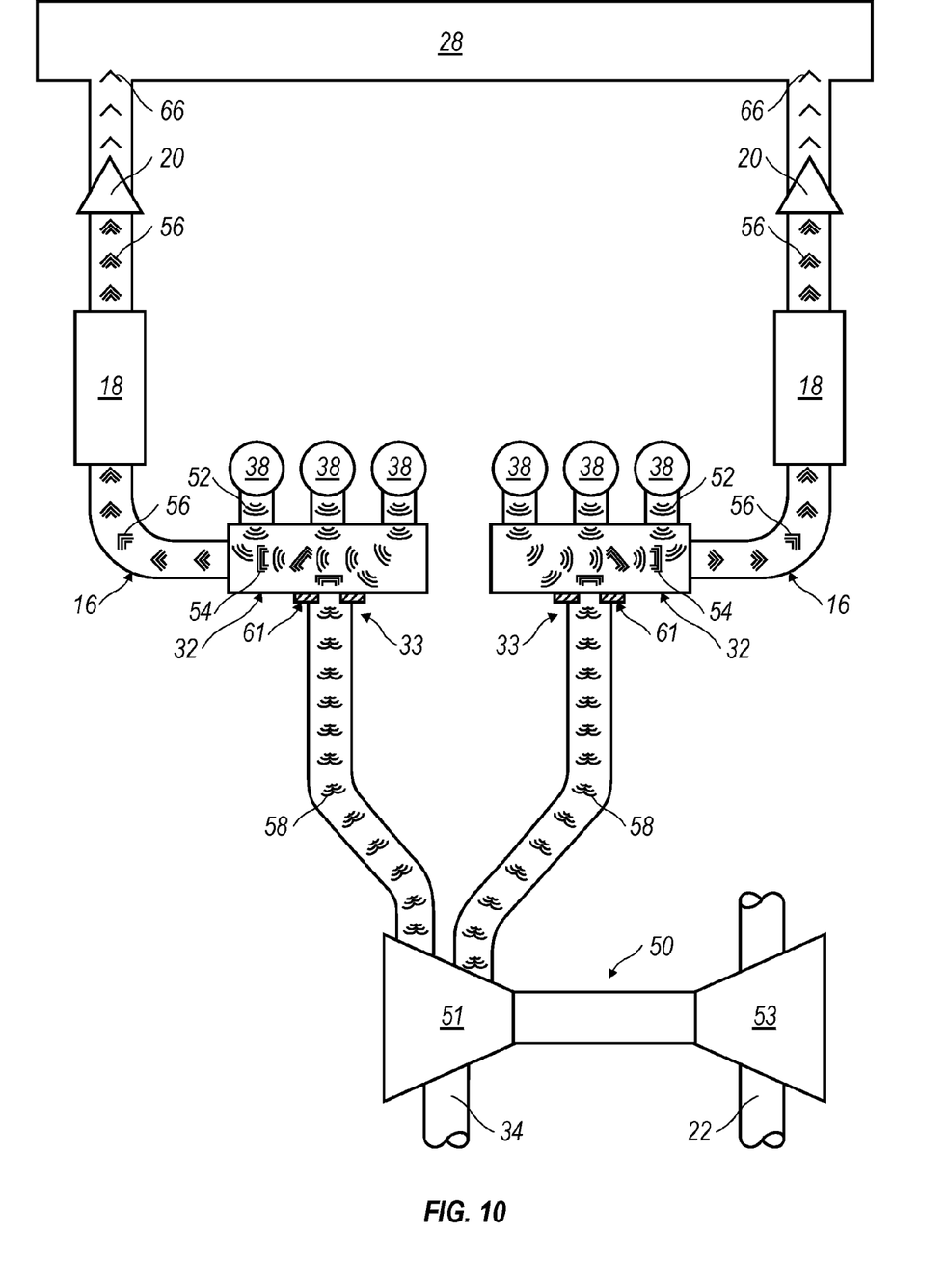
FIG. 10 is a schematic representation of an alternative embodiment of an exhaust gas recirculation system incorporating a reflector means at a manifold and illustrating the path of travel of the pressure pulses of varying magnitude induced in the exhaust system according to one aspect of the present invention.

FIG. 10 illustrates an alternative embodiment to the exemplary configuration of FIG. 1. Like reference numerals are used to designate like structures, the description of which has been provided hereinabove and to which reference can be made. A primary difference of this alternative embodiment is found at the manifold 32 which is configured to receive exhaust gases from a plurality of engine cylinders 38 and to convey at least a portion of the exhaust gases downstream to an exhaust outlet 33. A juncture off of the manifold 32 conveys a portion of the exhaust gases to an exhaust gas recirculation system. The reflector 61 is located at the manifold in associated with the exhaust outlet 33 and is adapted to reflect at least a portion of exhaust gas pressure pulses emitting from the combustion engine thereby causing a reflected pressure pulse to occur in the manifold. As before, this configuration results in the deflection of at least a portion of the reflected pressure pulse into the exhaust gas recirculation system thereby enhancing the efficiency of the exhaust gas recirculation system.

It is also contemplated that one or more manifolds 32 may be readily adapted with a reflector 31 configured according to the above-teachings associated with the gasket-style reflector 31 illustrated in FIG. 4 and which is adapted for location and securement between two connective flanges.

This is a preferred configuration in that the location of the reflector 31 can be easily accomplished in an original manufacture, or as a retro-fit on an existing manifold-to-exhaust outlet junction. Particularly advantageous is the accommodation of configurations of the reflector as a cast or machined restriction at the exhaust outlet of the manifold. As before, a one-way valve is located in the exhaust gas recirculation system and is configured to permit an upper-pressure portion of pressure pulses directed into the exhaust gas recirculation system to be conveyed to an inlet air manifold 28 of the combustion engine.

The foregoing description of preferred and other embodiments is not intended to limit or restrict the scope or applicability of the disclosed inventive concepts. It is intended that the invention include all modifications and alterations to the full extent that they come within the scope of the following claims or the equivalents thereof.

What is claimed is:

1. A method for increasing the amount of EGR flow and enhancing exhaust gas recirculation efficiency on a combustion engine, comprising:

providing a combustion engine having an exhaust system including a manifold configured to receive exhaust gases from a plurality of engine cylinders and to convey at least a portion of the exhaust gases downstream to an exhaust outlet;

providing at least one juncture off of the manifold that conveys at least a portion of the exhaust gases to an exhaust gas recirculation system;

locating a reflector at the manifold in association with the exhaust outlet, the reflector adapted to reflect at least a portion of exhaust gas pressure pulses emitting from the combustion engine thereby causing a reflected pressure pulse to occur in the manifold and configuring the reflector as a gasket secured between a first and a second flange; and deflecting at least a portion of the reflected pressure pulse into the exhaust gas recirculation system thereby enhancing the efficiency of the exhaust gas recirculation system.

2. A method for increasing the amount of EGR flow and enhancing exhaust gas recirculation efficiency on a combustion engine, comprising:

providing a combustion engine having an exhaust system including a manifold configured to receive exhaust gases from a plurality of engine cylinders and to convey at least a portion of the exhaust gases downstream to an exhaust outlet;

providing at least one juncture off of the manifold that conveys at least a portion of the exhaust gases to an exhaust gas recirculation system;

locating a reflector at the manifold in association with the exhaust outlet, the reflector adapted to reflect at least a portion of exhaust gas pressure pulses emitting from the combustion engine thereby causing a reflected pressure pulse to occur in the manifold and configuring the reflector as a cast restriction at the exhaust outlet of the manifold; and deflecting at least a portion of the reflected pressure pulse into the exhaust gas recirculation system thereby enhancing the efficiency of the exhaust gas recirculation system.

3. A method for increasing the amount of EGR flow and enhancing exhaust gas recirculation efficiency on a combustion engine, comprising:
   providing a combustion engine having an exhaust system including a manifold configured to receive exhaust gases from a plurality of engine cylinders and to convey at least a portion of the exhaust gases downstream to an exhaust outlet;
   providing at least one juncture off of the manifold that conveys at least a portion of the exhaust gases to an exhaust gas recirculation system;
   locating a reflector at the manifold in association with the exhaust outlet, the reflector adapted to reflect at least a portion of exhaust gas pressure pulses emitting from the combustion engine thereby causing a reflected pressure pulse to occur in the manifold and configuring the reflector as a machined restriction at the exhaust outlet of the manifold; and
   deflecting at least a portion of the reflected pressure pulse into the exhaust gas recirculation system thereby enhancing the efficiency of the exhaust gas recirculation system.

4. A method for increasing the amount of EGR flow and enhancing exhaust gas recirculation efficiency on a combustion engine, comprising:
   providing a combustion engine having an exhaust system including a manifold configured to receive exhaust gases from a plurality of engine cylinders and to convey at least a portion of the exhaust gases downstream to an exhaust outlet;
   providing at least one juncture off of the manifold that conveys at least a portion of the exhaust gases to an exhaust gas recirculation system;
   locating a reflector at the manifold in association with the exhaust outlet the reflector adapted to reflect at least a portion of exhaust gas pressure pulses emitting from the combustion engine thereby causing a reflected pressure pulse to occur in the manifold;
   locating a one-way valve in the exhaust gas recirculation system, the one-way valve being configured to permit an upper-pressure portion of pressure pulses directed into the exhaust gas recirculation system to be conveyed to an inlet air manifold of the combustion engine; and
   deflecting at least a portion of the reflected pressure pulse into the exhaust gas recirculation system thereby enhancing the efficiency of the exhaust gas recirculation system.

5. A method for increasing the amount of EGR flow and enhancing exhaust gas recirculation efficiency on a combustion engine, comprising:
   providing a combustion engine having an exhaust system in fluid communication, via at least one juncture with an exhaust gas recirculation system;
   locating a reflector in the exhaust system downstream of the at least one juncture, the reflector adapted to reflect at least a portion of exhaust gas pressure pulses emitting from the combustion engine thereby causing a reflected pressure pulse to occur upstream of the reflector;
   deflecting at least a portion of the reflected pressure pulse into the exhaust gas recirculation system thereby enhancing the efficiency of the exhaust gas recirculation system; and
   locating a one-way valve in the exhaust gas recirculation system, the one-way valve being configured to permit an upper-pressure portion of pressure pulses directed into the exhaust gas recirculation system to be conveyed to an inlet air manifold of the combustion engine.

6. The method of claim 5, further comprising:
configuring the one-way valve to be biased toward a closed configuration by a spring force, the spring force being selected to be overcome and the one-way valve moved to an open configuration when an upstream gas pressure thereto exceeds a predetermined threshold pressure thereby capturing the upper-pressure portion of the pressure pulses for conveyance to the inlet air manifold.

7. The method of claim 5, further comprising:
locating a turbine in the exhaust system; and
locating the reflector upstream of the turbine in the exhaust system.

8. The method of claim 5, further comprising:
providing a turbine in fluid communication with the exhaust system for recovering energy from the exhaust gas pressure pulses emitted from the combustion engine; and
selecting the turbine so that a collective efficiency of energy recovery and exhaust gas recirculation is optimized.

9. The method of claim 5, further comprising:
configuring the reflector as a gasket secured between a first and a second flange.

10. The method of claim 5, further comprising:
configuring the exhaust system to define an exhaust gas flow path and configuring the reflector as a projection into the exhaust gas flow path.

11. The method of claim 10, further comprising:
constructing the reflector in a sheet form thereby establishing an abrupt restriction in the exhaust gas flow at an upstream side of the reflector and an abrupt expansion in the exhaust gas flow at a downstream side of the reflector.

12. The method of claim 10, further comprising:
arranging a reflective face of the reflector at a substantially right angle to the exhaust gas flow path.

13. The method of claim 12, further comprising:
configuring the reflective face symmetrically with respect to the exhaust gas flow.

14. An enhanced exhaust gas recirculation system for a combustion engine comprising:
   a combustion engine having an exhaust system in fluid communication, via at least one juncture, with an exhaust gas recirculation system;
   a reflector means located in the exhaust system downstream of the at least one juncture, the reflector means configured for reflecting at least a portion of exhaust gas pressure pulses emitting from the combustion engine thereby causing a reflected pressure pulse to occur upstream of the reflector and the exhaust and exhaust gas recirculation systems being together configured to deflect at least a portion of the reflected pressure pulse into the exhaust gas recirculation system thereby enhancing the efficiency of the exhaust gas recirculation system; and
   a one-way valve located in the exhaust gas recirculation system, the one-way valve being configured to permit an upper-pressure portion of pressure pulses directed into the exhaust gas recirculation system to be conveyed to an inlet air manifold of the combustion engine.

15. The enhanced exhaust gas recirculation system of claim 14, further comprising:

the one-way valve being biased toward a closed configuration by a spring force, the spring force being selected to be overcome and the one-way valve moved to an open configuration when an upstream gas pressure thereto exceeds a predetermined threshold pressure thereby capturing the upper-pressure portion of the pressure pulses for conveyance to the inlet air manifold.

16. The enhanced exhaust gas recirculation system of claim 14, further comprising:

a turbine located in the exhaust system; and the reflector being located upstream of the turbine in the exhaust system.

17. The enhanced exhaust gas recirculation system of claim 14, further comprising:

a turbine in fluid communication with the exhaust system for recovering energy from the exhaust gas pressure pulses emitted from the combustion engine and the turbine being selected so that a collective efficiency of energy recovery and exhaust gas recirculation is optimized.

18. The enhanced exhaust gas recirculation system of claim 14, further comprising:

the reflector being configured as a gasket secured between a first and second flange.

19. The enhanced exhaust gas recirculation system of claim 14, further comprising:

the reflector being configured as a cast and/or machined restriction in the exhaust manifold.

20. The method of claim 14, further comprising:

the exhaust system defining an exhaust gas flow path and the reflector configured as a projection into the exhaust gas flow path.

21. The enhanced exhaust gas recirculation system of claim 20, further comprising:

the reflector being constructed in sheet form thereby establishing an abrupt restriction in the exhaust gas flow at an upstream side thereof and an abrupt expansion in the exhaust gas flow at a downstream side thereof.

22. The method of claim 20, further comprising:

a reflective face of the reflector arranged at a substantially right angle to the exhaust gas flow path.

23. The enhanced exhaust gas recirculation system of claim 22, further comprising:

the reflective face being symmetrically configured with respect to the exhaust gas flow.

* * * * *